(12) United States Patent
Andersson et al.

(10) Patent No.: US 10,289,267 B2
(45) Date of Patent: May 14, 2019

(54) PLATFORM FOR THIRD-PARTY SUPPLIED CALLS-TO-ACTION

(75) Inventors: Rasmus Mathias Andersson, San Francisco, CA (US); Rose Yao, San Francisco, CA (US); Erick Tseng, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 62 days.

(21) Appl. No.: 13/229,404

(22) Filed: Sep. 9, 2011

(65) Prior Publication Data

US 2013/0067022 A1 Mar. 14, 2013

(51) Int. Cl.
*G06F 17/30* (2006.01)
*G06F 3/0482* (2013.01)

(52) U.S. Cl.
CPC ...... *G06F 3/0482* (2013.01); *G06F 17/30943* (2013.01)

(58) Field of Classification Search
CPC ............... G06F 17/30; G06F 17/3005; G09G 2340/145
USPC ....................... 705/35–44; 709/217; 715/864
See application file for complete search history.

(56) References Cited

U.S. PATENT DOCUMENTS

| | | |
|---|---|---|
| 5,627,980 A | 5/1997 | Schilit |
| 6,028,602 A | 2/2000 | Weidenfeller |
| 6,380,957 B1 | 4/2002 | Banning |
| 6,973,625 B1 | 12/2005 | Lupo |
| 7,073,187 B1 | 7/2006 | Hendricks |
| 7,203,701 B1 | 4/2007 | Packebush |
| 7,249,328 B1 | 7/2007 | Davis |
| 7,353,464 B1 | 4/2008 | Kundu |
| 7,797,635 B1 | 9/2010 | Denise |
| 7,831,928 B1 | 11/2010 | Rose et al. |
| 7,934,161 B1 | 4/2011 | Denise |
| 7,966,345 B1 | 6/2011 | Funston |
| 8,935,237 B2 * | 1/2015 | Andersson ........ G06F 17/30991 707/722 |
| 9,223,461 B1 | 12/2015 | Brown et al. |

(Continued)

FOREIGN PATENT DOCUMENTS

| | | |
|---|---|---|
| JP | 2000-215138 A | 8/2000 |
| JP | 2007-011513 A | 1/2007 |

OTHER PUBLICATIONS

U.S. Appl. No. 13/229,303, filed Sep. 9, 2011, Andersson.

(Continued)

*Primary Examiner* — Hani M Kazimi
(74) *Attorney, Agent, or Firm* — Morgan, Lewis & Bockius LLP

(57) ABSTRACT

In one embodiment, a first computing system receives a request from a second computing system, the request indicating an information item displayed on the second computing system. In response to the request, the first computing system determines whether the information item is associated with any call-to-action provided by any third computing system. If the information item is associated with one or more calls-to-action provided by one or more third computing systems, then the first computing system sends the one or more calls-to-action provided by the one or more third computing systems to the second computing system to be displayed on the second computing system in connection with the information item.

21 Claims, 14 Drawing Sheets

(56) References Cited

U.S. PATENT DOCUMENTS

| | | | |
|---|---|---|---|
| 2002/0032631 A1* | 3/2002 | Rose | 705/37 |
| 2002/0188527 A1* | 12/2002 | Dillard et al. | 705/27 |
| 2003/0137531 A1 | 7/2003 | Katinsky | |
| 2005/0060304 A1 | 3/2005 | Parikh | |
| 2005/0102635 A1 | 5/2005 | Jiang | |
| 2006/0036615 A1 | 2/2006 | Masselle | |
| 2006/0200455 A1 | 9/2006 | Wilson | |
| 2006/0242121 A1 | 10/2006 | Devorchik | |
| 2006/0277308 A1 | 12/2006 | Morse | |
| 2007/0083906 A1 | 4/2007 | Welingkar | |
| 2007/0100650 A1* | 5/2007 | Ramer | G06F 17/30749 705/26.1 |
| 2007/0156677 A1 | 7/2007 | Szabao | |
| 2007/0174415 A1 | 7/2007 | Cha | |
| 2007/0282956 A1 | 12/2007 | Staats | |
| 2008/0168033 A1 | 7/2008 | Stanley | |
| 2009/0222769 A1 | 9/2009 | Sloo | |
| 2009/0240569 A1* | 9/2009 | Ramer | G06F 17/30749 715/864 |
| 2009/0327184 A1 | 12/2009 | Nishizaki | |
| 2010/0030752 A1 | 2/2010 | Goldentouch | |
| 2010/0082573 A1 | 4/2010 | Canel | |
| 2010/0094878 A1* | 4/2010 | Soroca | G06F 17/30035 707/748 |
| 2010/0174724 A1 | 7/2010 | Wallace | |
| 2010/0293598 A1* | 11/2010 | Collart | G06F 17/30056 726/3 |
| 2010/0312851 A1* | 12/2010 | Jackson | H04L 67/104 709/217 |
| 2011/0047013 A1* | 2/2011 | McKenzie, III | 705/14.4 |
| 2011/0107197 A1 | 5/2011 | DeLuca | |
| 2011/0107231 A1 | 5/2011 | Gueldemeister | |
| 2011/0178875 A1* | 7/2011 | Dharmaji | 705/14.64 |
| 2011/0184809 A1* | 7/2011 | Beavers et al. | 705/14.64 |
| 2011/0225178 A1 | 9/2011 | Ingrassia et al. | |
| 2011/0271230 A1 | 11/2011 | Harris | |
| 2011/0307318 A1* | 12/2011 | LaPorte et al. | 705/14.33 |
| 2012/0059713 A1* | 3/2012 | Galas et al. | 705/14.49 |
| 2014/0258285 A1 | 9/2014 | Levine | |

OTHER PUBLICATIONS

U.S. Appl. No. 13/229,365, filed Sep. 9, 2011, Andersson.
International Search Report and Written Opinion for International Application PCT/US2012/051523, dated Feb. 20, 2013.
Non-Final Office Action for U.S. Appl. No. 13/229,303, dated Apr. 8, 2013.
Non-Final Office Action for U.S. Appl. No. 13/229,365, dated Mar. 29, 2013.
Response to Final Office Action for U.S. Appl. No. 13/229,303, dated Jan. 15, 2014.
Non-Final Office Action for U.S. Appl. No. 13/229,303, dated Apr. 24, 2014.
Response to Non-Final Office Action for U.S. Appl. No. 13/229,303, dated Jun. 4, 2014.
Non-Final Office Action for U.S. Appl. No. 13/229,365, dated Jun. 20, 2014.
Response to Non-Final Office Action for U.S. Appl. No. 13/299,365 (10 pp.), dated Jun. 28, 2013.
Final Office Action for U.S. Appl. No. 13/229,365 (12 pp.), dated Sep. 13, 2013.
Final Office Action for U.S. Appl. No. 13/229,303 (15 pp.), dated Nov. 7, 2013.
Response to Final Office Action for U.S. Appl. No. 13/299,365 (11 pp.), dated Dec. 11, 2013.
Response to Non-Final Office Action for U.S. Appl. No. 13/229,365, dated Sep. 24, 2014.
Notice of Allowance for U.S. Appl. No. 13/229,365, dated Oct. 24, 2014.
Supplementary European Search Report from European Patent Office for EP Application No. 12830300.5, dated Feb. 24, 2015.
Response to Final Office Action for U.S. Appl. No. 13/229,303, dated Oct. 24, 2014.
Non-Final Office Action for U.S. Appl. No. 13/229,303, dated Apr. 10, 2015.
Amendment After Allowance for U.S. Appl. No. 13/229,365, dated Oct. 30, 2014.
Notice of Allowance for U.S. Appl. No. 13/229,365, dated Dec. 2, 2014.
Final Office Action for U.S. Appl. No. 13/229,303, dated Sep. 25, 2015.
Response to Non-Final Office Action for U.S. Appl. No. 13/229,303, dated Jun. 17, 2015.
Facebook Inc., Office Action, CN201280055007.2, dated Jul. 25, 2016, 9 pgs.
Facebook Inc., Letters Patent, MX/a/2014/002790, dated Dec. 8, 2016, 3 pgs.
Anderson, Office Action, U.S. Appl. No. 13/229,303, dated Apr. 22, 2016, 22 pgs.
Anderson, Final Office Action, U.S. Appl. No. 13/229,303, dated Jan. 11, 2017, 25 pgs.
Facebook Inc., 2nd Office Action, CN201280055007.2, dated Jun. 8, 2017, 6 pgs.
Facebook Inc., Notification for Reasons of Rejection, JP2014-529752, dated Jul. 25, 2017, 8 pgs.
Anderson, Office Action, U.S. Appl. No. 13/229,303, dated Nov. 30, 2017, 30 pgs.
Response to Non-Final Office Action for U.S. Appl. No. 13/229,303, dated Jul. 2, 2013.
Final Office Action for U.S. Appl. No. 13/229,303, dated Aug. 1, 2014.

* cited by examiner

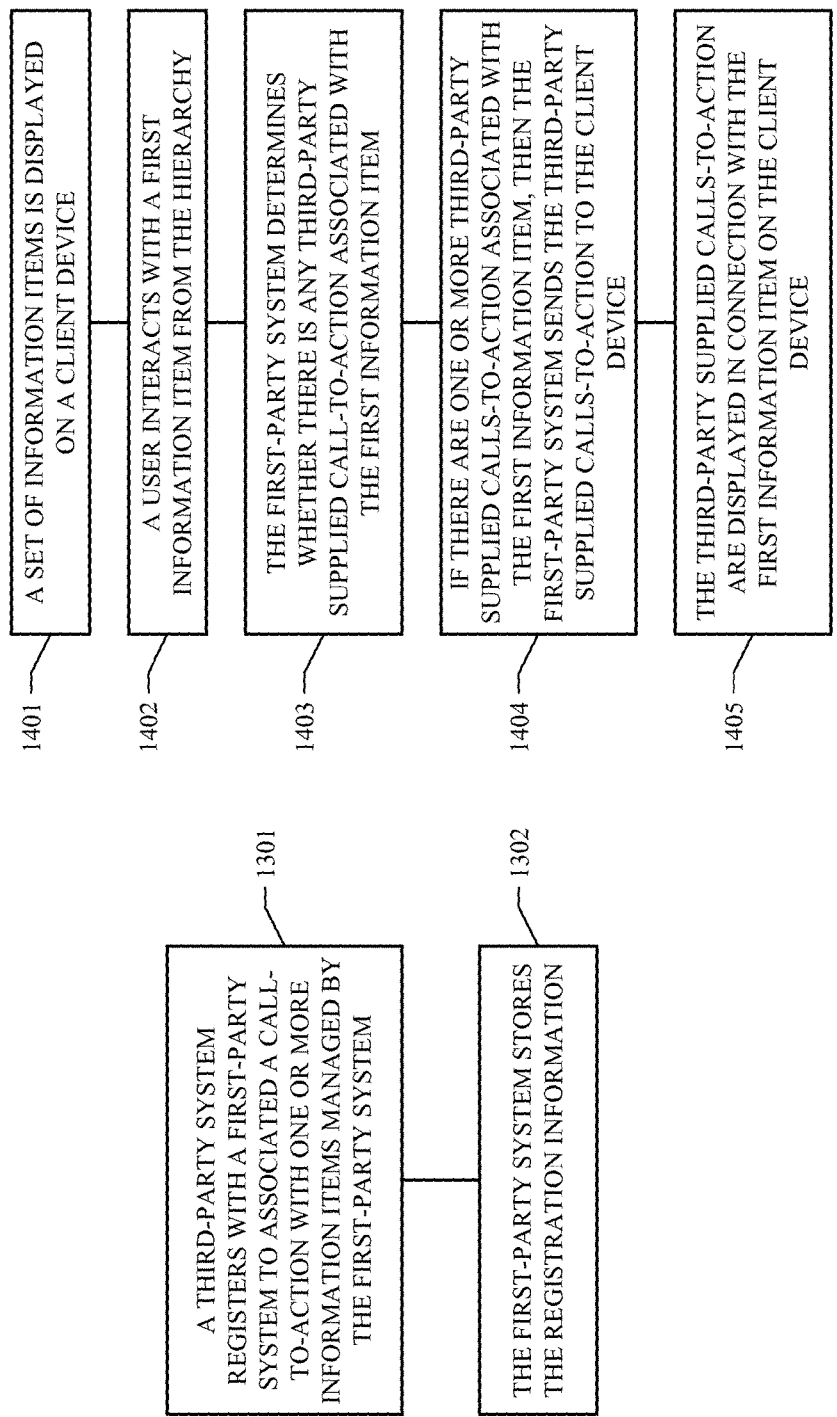

PLATFORM FOR THIRD-PARTY SUPPLIED CALLS-TO-ACTION

TECHNICAL FIELD

This disclosure generally relates to a platform that enables third-party systems to associate calls-to-action with specific information items managed by a first-party system.

BACKGROUND

Certain types of electronic devices, especially mobile or handheld devices such as mobile or smart telephones and notebook or netbook computers, have relatively small displays due to the relatively small sizes of the devices themselves. Consequently, not much information can be presented within such a small display area concurrently. There are different designs that help organize and display multiple information items within a relatively small display area. For example, a large set of information items may be divided into multiple subsets, each containing a small number of information items. Each subset of information items is displayed on a different screen, and a user may page through multiple screens to review multiple subsets of information items.

SUMMARY

This disclosure generally relates to presenting information items organized in hierarchies.

In particular embodiments, a first computing system receives a request from a second computing system, the request indicating an information item displayed on the second computing system. In response to the request, the first computing system determines whether the information item is associated with any call-to-action provided by any third computing system. If the information item is associated with one or more calls-to-action provided by one or more third computing systems, then the first computing system sends the one or more calls-to-action provided by the one or more third computing systems to the second computing system to be displayed on the second computing system in connection with the information item.

These and other features, aspects, and advantages of the disclosure are described in more detail below in the detailed description and in conjunction with the following figures.

BRIEF DESCRIPTION OF THE DRAWINGS

FIG. 13 illustrates an example method for a third-party system to associate calls-to-action to individual information items managed by a first-party system.

FIG. 14 illustrates an example method for presenting third-party supplied calls-to-action in connection with their associated information items on a client device.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
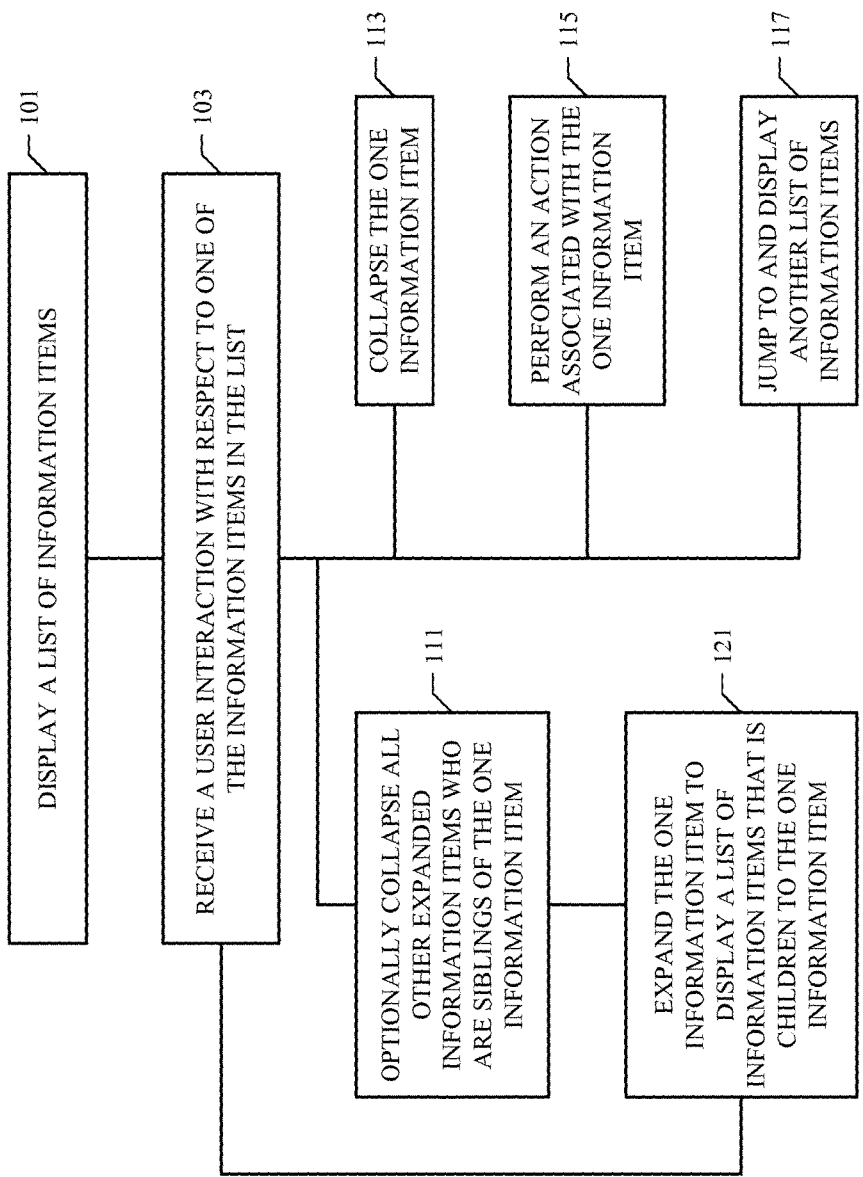
FIG. 1 illustrates an example method for presenting information items organized in a hierarchy.

In particular embodiments, information items organized in a hierarchy are displayed on a mobile device. When a user interacts with (e.g., selects or clicks on) a specific information item, that information item is expanded so that its child nodes or elements are displayed. The user does not need to page through multiple screens. When an information item is expanded, its children are displayed on the same screen where the information item itself is displayed. FIG. 1 illustrates an example method for presenting information items organized in a hierarchy (e.g., on mobile devices).

Figure 2:
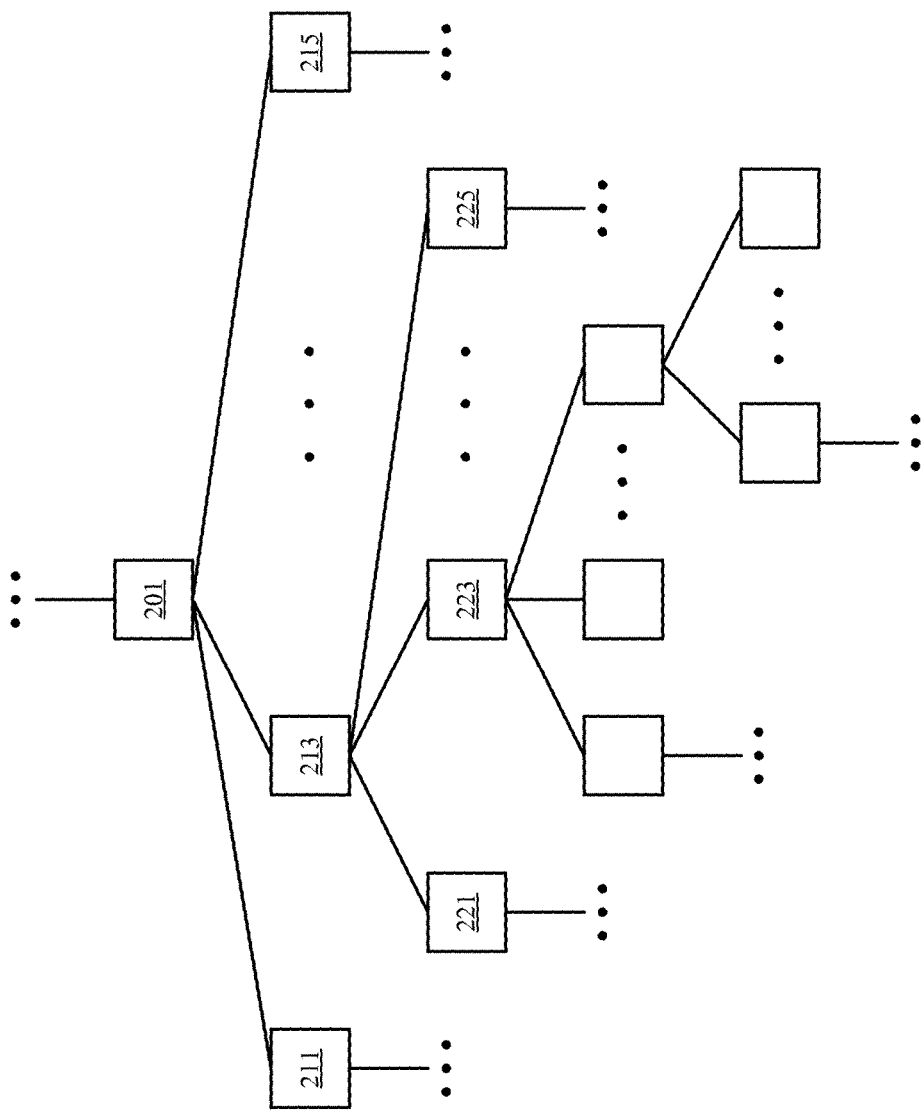
FIG. 2 illustrates a portion of an example hierarchy of information items.

Any number (i.e., two or more) of information items may be organized into a hierarchy, which may indicate various relationships between the individual information items. As an example, FIG. 2 illustrates a portion of a hierarchy. In this case, each node may correspond to a specific information item. There may be any number of levels in a hierarchy, and any number of nodes at each level. Each node, except the root node, has a parent node. Thus, each information item, except the one corresponding to the root node, has a parent information item. Each node, except the leaf nodes, may have any number of children. Thus, each information item, except the ones corresponding to the leaf nodes, may have any number of child information items. In addition, when two nodes share the same parent, they are considered siblings of each other. In FIG. 2, with respect to node 213, node 201 is its parent, nodes 211 and 215 are its siblings, and nodes 221, 223, and 225 are its children. Note that any portion of a large hierarchy is itself a hierarchy.

There may be various types of information items, and this disclosure contemplates any applicable type of information items. For example and without limitation, an information item may be an email, a message, a notification, a post, a web page, a clickable link, an icon, a news story, a search result, an action, a user, an image, a video, a telephone number, an address, and so on. A hierarchy may consist of a collection of information items all of the same type (e.g., a hierarchy of emails, a hierarchy of notifications, a hierarchy of contact information) or a combination of information items of different types (e.g., a hierarchy of emails, messages, news stories, and notifications).

To present a hierarchy of information items on a mobile device (e.g., a mobile or smart telephone or a netbook or notebook computer), particular embodiments may display a list of information items, as illustrated in STEP 101. It is not necessary that the presentation always starts with the root of the hierarchy, although it can. When applicable, the presentation may start at any level in the hierarchy. For example, the list of information items may be a set of siblings that shares a common parent (e.g., nodes 211, 213, and 215) at a specific level in the hierarchy.

Figure 3:
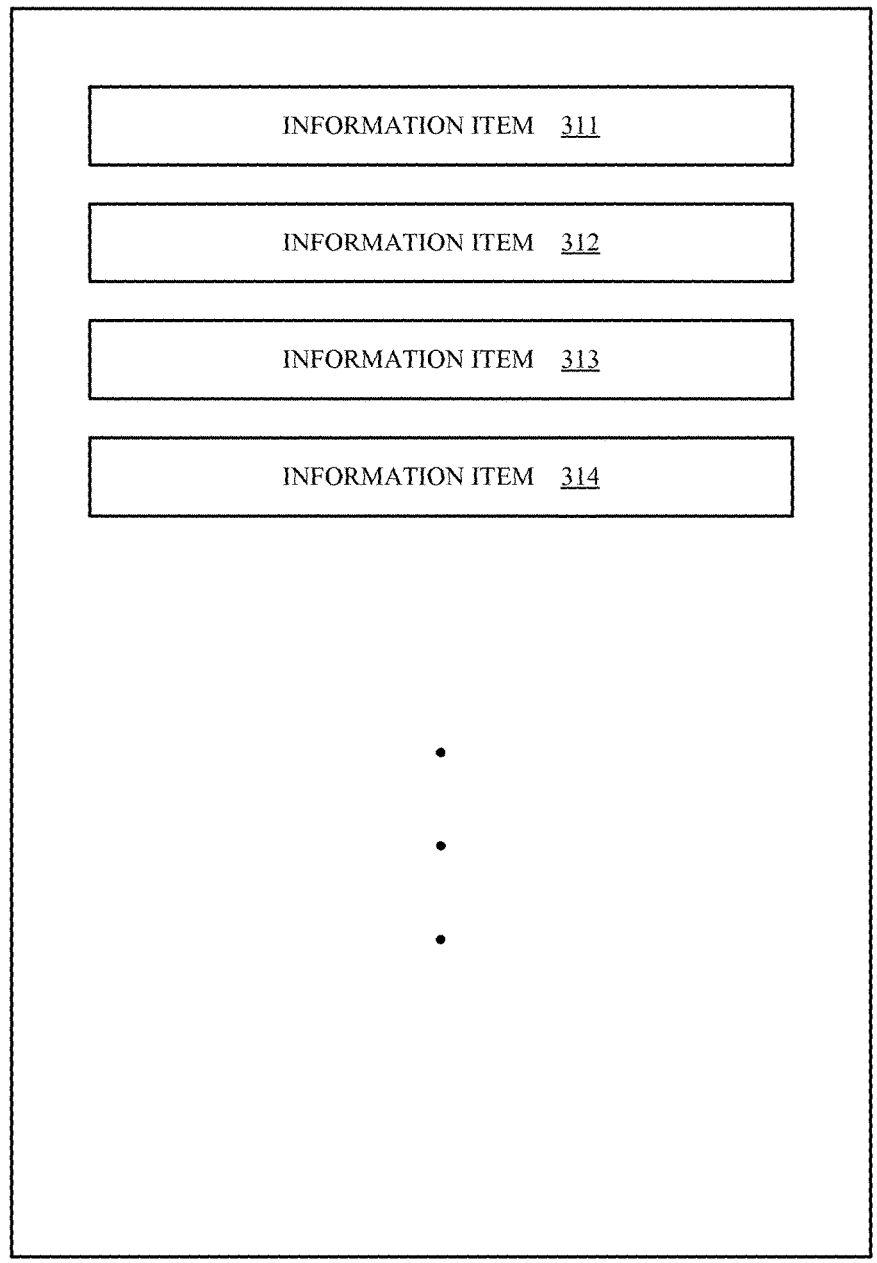
FIGS. 3-7 illustrate example presentations of information items organized in a hierarchy.

FIG. 3 illustrates an example presentation of a list of information items (e.g., information items 311, 312, 313, 314, . . . ). There may be any number (i.e., one or more) of information items in the list, as a parent may have any number of children. In particular embodiments, an information item may be represented as image, text, icon, clickable link, etc., or a combination thereof. In additional, in particular embodiments, an information item, whether corresponding to a non-leaf node or a leaf node, may be associated with one or more calls-to-action. A call-to-action corresponds to a specific action the user may perform in connection with the information item. In particular embodiments, each call-to-action associated with an information item may be represented as a clickable icon, which may be displayed in close proximity of the information item. The user may click the icon to cause the corresponding action to be performed. In particular embodiments, when the list of information items (e.g., information items 311, 312, 313, 314, . . . ) is displayed on a screen of a client device (e.g., a mobile device), the information items may consume approximately the entire width of the display screen. Similarly, when the list of information items is displayed within a designated area on a screen of a client device (e.g., a mobile device), the information items may consume approximately the entire width of the designated area of the display screen.

Suppose that a user interacts with one of the information items (e.g., information item 312) by, for example, clicking or tapping on it, as illustrated in STEP 103. Mobile devices provide various methods that enable their users to provide inputs to the devices. For example, some mobile devices incorporate touch-sensitive screens so that their users may provide inputs by touching the screens with their fingers or styluses. Other mobile devices incorporate keys or trackballs, which may be used to provide user inputs. This disclosure contemplates any applicable means to provide user inputs to mobile devices.

Depending on the nature, type, or current state of information item 312 as well as its siblings, the user interaction may result in several different responses.

First, if information item 312 has any child (i.e., corresponds to a non-leaf node) and is currently in collapsed form, then information item 312 may be expanded so that its children may be displayed. In some implementations, among a set of siblings that shares a common parent, only one sibling can be expanded at a time. In this case, if any sibling of information item 312 is currently in expanded form, that sibling is automatically collapsed, as illustrated in STEP 111. Alternatively, in other implementations, among a set of siblings that shares a common parent, any number of siblings may be expanded at the same time. In this case, there is no need to collapse any sibling of information item 312, even if the sibling is currently in expanded form, and STEP 111 is not performed. Alternatively, in yet other implementations, given a set of information items at the same level of the hierarchy, only one information item can be expanded at a time, regardless of whether or not these information items are siblings and share a common parent. In this case, if any information item at the same level of the hierarchy as information item 312 is currently in expanded form, that information item is automatically collapsed.

Figure 4:
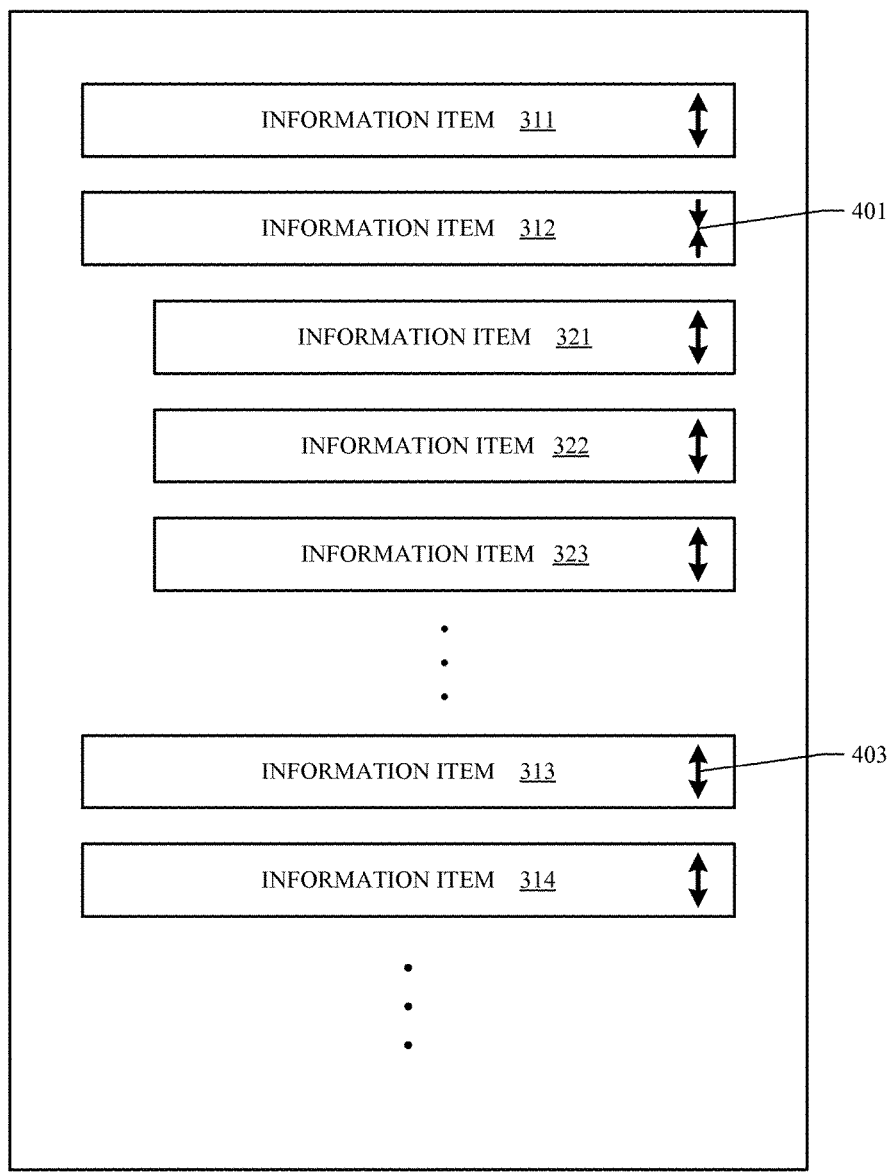

Information item 312 is expanded and each of its children is displayed, as illustrated in STEP 121. FIG. 4 illustrates an example presentation where information item 312 has been expanded and its children, information items 321, 322, 323, . . . , are displayed. The children of information item 312 are displayed (i.e., inserted) between information item 312 and information item 313, which immediately follows information item 312 in FIG. 3. To make room for the children of information item 312, those information items that follow information item 312, including information items 313 and 314, are pushed further down the display. Again, in particular embodiments, when the hierarchy of information items (e.g., information items 311, 312, 321, 322, 323, 313, 314, . . . ) is displayed on a screen of a client device (e.g., a mobile device), the information items may consume approximately the entire width of the display screen. Similarly, when the hierarchy of information items is displayed within a designated area on a screen of a client device (e.g., a mobile device), the information items may consume approximately the entire width of the designated area of the display screen.

The following example pseudo code illustrates expanding an information item and displaying its children. This example assumes that among a set of siblings sharing a common parent, only one sibling (i.e., one information item) can be expanded at a time.

```
// performed upon expanding an information item
on expand:
    // collapse all siblings of the information item
    for each sibling:
        sibling.collapse( )
    // display all children of the information item
    for each child:
        child.show( )
// indicates whether an information item should
// display itself and its children
if (parent is expanded)
    return TRUE;
else
    return FALSE;
```

In particular embodiments, an icon is associated with each information item, which indicates whether it is currently in the expanded or collapsed form. For example, in FIG. 4, information item 312 is currently in the expanded form. Icon 401 is associated with information item 312. The user may click on icon 401 to collapse information item 312. On the other hand, information item 313 is currently in the collapsed form. Icon 403 is associated with information item 313. The user may click on icon 403 to expand information item 313.

Once information item 312 is expanded and its children, information items 321, 322, 323, . . . , are displayed, the user may interact with any one of the children, similarly as the user interacting with the parent. The children form another list of information items at another level of the hierarchy, and the steps illustrated in FIG. 1 may be similarly applied at that level of the hierarchy.

Figure 5:
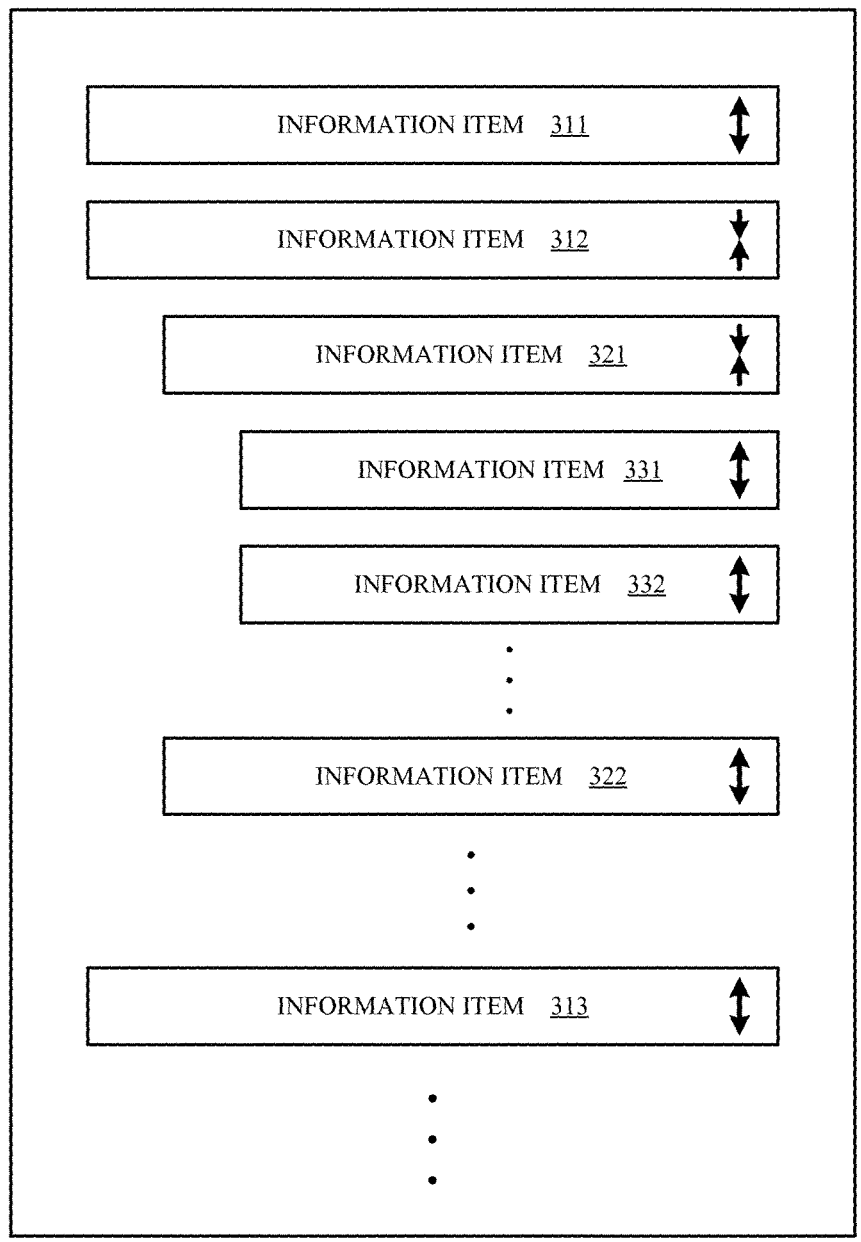

For example, suppose that the user clicks or taps on information item 321, which is one of the children of information item 312. Depending on the nature, type, or current state of information item 321 as well as its siblings, the user interaction may result in several different responses. The responses are similar to those of information item 312. For example, if information item 321 has any child and is currently in collapsed form, then information item 321 may be expanded so that its children, information items 331, 332, . . . , may be displayed, as illustrated in STEP 121. Again, in some implementations, among a set of siblings sharing a common parent, only one sibling can be expanded at a time. In this case, all siblings of information items 321, including information item 322, are automatically collapsed, as illustrated in STEP 131 111. FIG. 5 illustrates an example presentation where information item 312 is expanded, and information item 321, a child of information item 312, is also expanded.

Second, if information item 312 is currently in expanded form, then information item 312 may be collapsed, as illustrated in STEP 113. For example, suppose that the first time the user interacts with information item 312, the interaction results in information item 312 being expanded and its children being displayed. The second time the user interacts with information item 312 again, the interaction may result in information item 312 being collapsed. The user may thus toggle between expanding and collapsing an information item.

Third, if information item 312 does not have any child (i.e., information item 312 is a leaf node), or if a call-to-action is associated with information item 312, an action associated with information item 312 may be performed, as illustrated in STEP 115. In particular embodiments, a leaf information item may be associated with an action. When the user interacts with such a leaf information item, the action associated with that leaf information item is performed.

Fourth, if information item 312 is associated with another list of information items, the new list of information items may be displayed, replacing the current list of information items, as illustrated in STEP 117. In particular embodiments, the other list of information items may also be a part of a hierarchy. In addition, the two lists of information items may belong to the same hierarchy or to different hierarchies. The user may thus jump between different hierarchies of information items.

In particular embodiments, an animated sequence may illustrate each transition. For example, when an information item is expanded or collapsed, the transition from one state to another may be illustrated using an animated sequence. In particular embodiments, data pre-fetching may be implemented to improve performance. For example, for each information item that is currently displayed, its children are pre-fetched into cache so that if and when the user interacts with a specific information item, its children are readily available to be displayed.

To further explain some of the steps illustrated in FIG. 1, consider the following examples.

Figure 6:
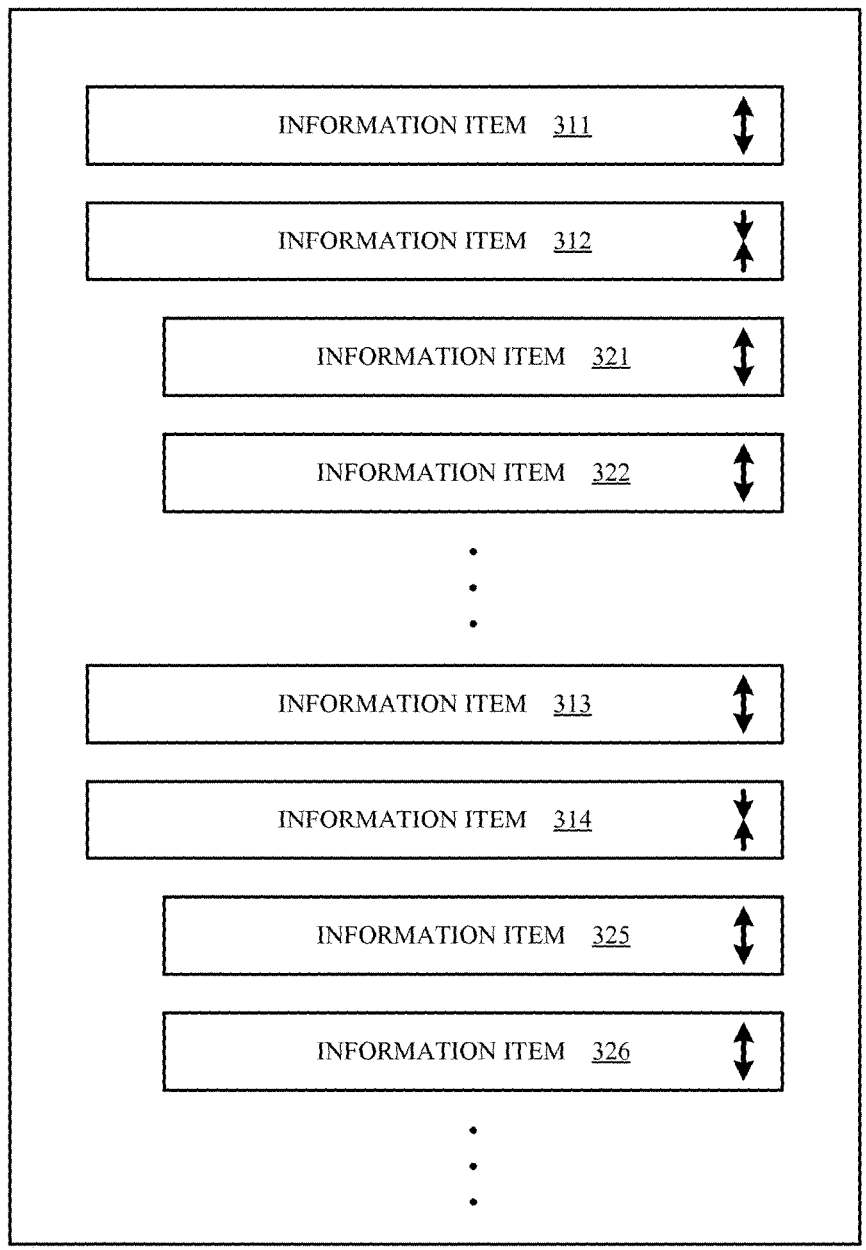
Figure 7:
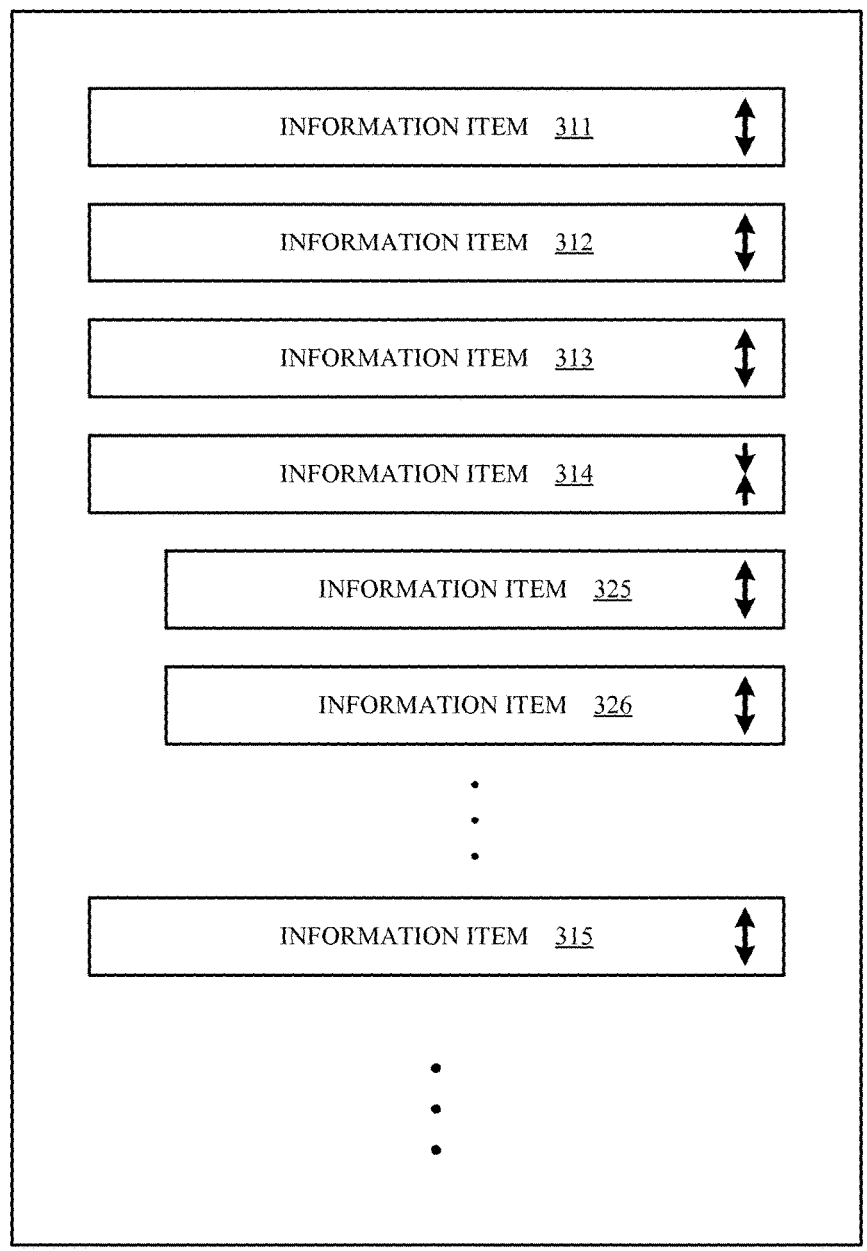

First, in FIG. 4, suppose that information items 311, 312, 313, 314, . . . , all share a common parent and thus are siblings. Information item 312 has been expanded. Further suppose that the user now interacts with information item 314 (e.g., by clicking or tapping on it), which causes information item 314 to be expanded as well and its children to be displayed. In some implementations, information item 312 is not automatically collapsed. Thus, both information items 312 and 314 are expanded, and their respective children are displayed at the same time, as illustrated in FIG. 6. Alternatively, in other implementations, information item 312 is automatically collapsed, and only information item 314 is expanded and its children are displayed, as illustrated in FIG. 7. In either case, the children of information item 314, information items 325, 326, . . . , are displayed immediately below information item 314. Those information items that are siblings of information item 314 but are displayed below information item (e.g., information item 315) are pushed further down to make room for the children of information item 314.

Second, for some types of information items, their children may be actions that users may perform in connection with the information item. As one example, an information item may be an email, and its children may include actions such as "read", "reply", "forward", and "delete". By expanding the email, the children that are actions that a user may perform in connection with the email may be displayed, and the user may interact with any one of the children to perform the corresponding action. As another example, an information item may be an invitation, and its children may include actions such as "accept", "decline", "tentative", and "RSVP". Again, by expanding the invitation, the children that are actions that a user may perform in connection with the invitation may be displayed, and the user may interact with any one of the children to perform the corresponding action. As a third example, an information item may be a person's name, and its children may be information about the person, such as his or her email address, telephone number, mailing address, etc. By expanding the person, the person's information may be displayed. The user may interact with a child to perform an action in connection with the person. For example, by interacting with the person's email address, the user may compose and send an email to the person; and by interacting with the person's telephone number, a call may be initiated to the person's telephone or the user may compose and send a text message to the person's telephone.

Third, some types of information items may be linked to other hierarchies of information items or other objects. As one example, an information item may be a link to a web page. When the user interacts with the link, the web page itself may be displayed, replacing all the currently displayed information items. As another example, an information item may be a news feed, which includes a collection of news stories arranged in another hierarchy. Expanding the news feed may cause the collection of news stories to be displayed, replacing all the currently displayed information items. The user may thus jump from a node in one hierarchy to another hierarchy. Similarly, an information item may be an address book, which includes a collection of names, telephone numbers, addresses, etc., arranged in a hierarchy. Expanding the address book may cause a list of names to be displayed, replacing all the currently displayed information items.

In particular embodiments, the information items may reside on the mobile device where they are displayed or may be retrieved or received from remote devices (e.g., servers or databases) via suitable communications networks. In particular embodiments, the user of the mobile device may be a member of an online social network. In this case, some of the information items may be information associated with the online social networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. The user may receive messages, notifications, invitations, friend requests, etc., from other member of the online social network, and each of these may be an information item in the hierarchy.

In particular embodiments, the method of presenting a hierarchy of information items as described above may be applied to presenting a hierarchy of search results. The Internet provides a vast amount of information. The individual information items may have various formats, such as, for example and without limitation, texts, audios, videos, images, web pages, documents, executables, etc. The information items are stored at many different sites, such as on computers and servers, in databases, etc., around the world. These different sites are communicatively linked to the Internet through various network infrastructures. Any person may access the publicly available information items via a suitable network device (e.g., a computer, a smart mobile telephone, etc.) connected to the Internet.

However, due to the sheer amount of information available on the Internet, it is impractical as well as impossible for a person (e.g., a user) to manually search throughout the Internet for specific information items. Instead, most network users rely on different types of computer-implemented tools to help them locate the desired information items. One of the most commonly and widely used computer-implemented tools is a search tool or a search engine. To search for information relating to a specific subject matter or topic, a user typically provides a short phrase or a few keywords describing the subject matter, often referred to as a "search query" or simply "query", to a search tool. The search tool conducts a search based on the search query using various search algorithms and generates a set of search results that are most likely to be related to the search query. The search results are then presented to the user.

Sophisticated search tools implement many other functionalities in addition to merely identifying the relevant search results as a part of the search process. For example, a search tool usually ranks the identified search results according to their relative degrees of relevance with respect to the search query, such that the search results that are relatively more relevant to the search query are ranked higher and consequently are presented to the user before the search results that are relatively less relevant to the search query.

Figure 8:
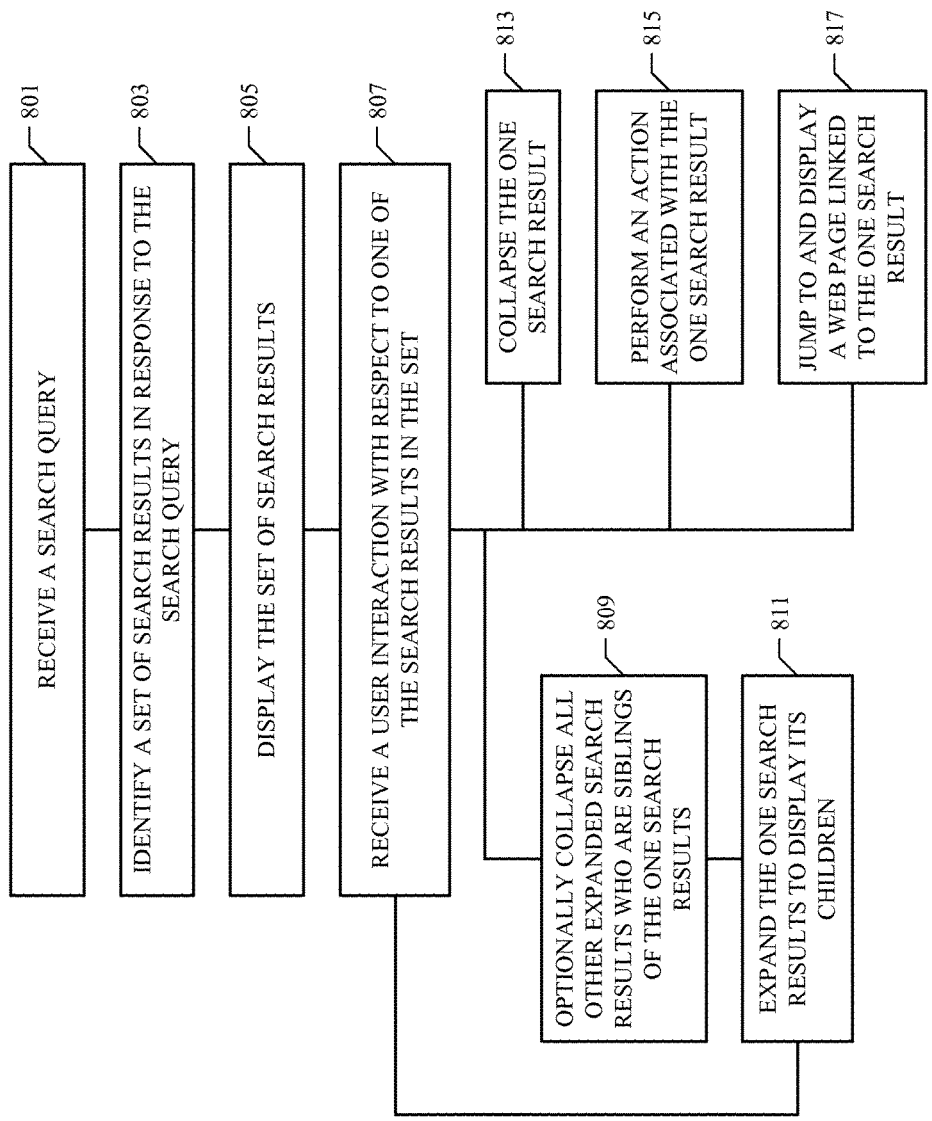
FIG. 8 illustrates an example method for presenting a set of search results organized in a hierarchy.
Figure 9:
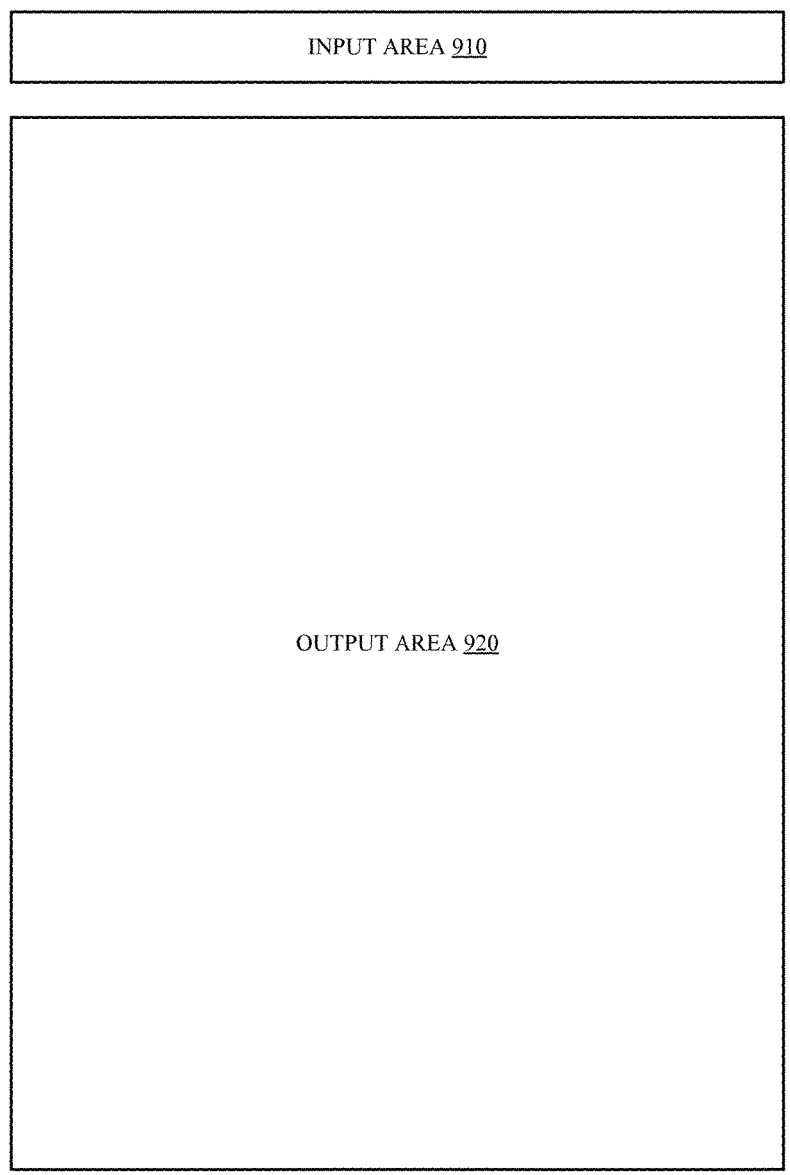
FIG. 9 illustrates an example user interface of a search tool.

FIG. 8 illustrates an example method for presenting a set of search results organized in a hierarchy. In particular embodiments, a user may provide a search query to a search tool, as illustrated in STEP 801. To interact with the user (e.g., receiving inputs from the user or presenting outputs to the user), the search tool may provide a user interface. FIG. 9 illustrates an example user interface 900, which includes an input area 910 and an output area 920. The user may enter search queries through input area 910, and search results may be displayed in output area 920. Once the search tool is invoked, user interface 900 may be displayed on the screen of a client device (e.g., a mobile telephone or a computer) used by the user to conduct the searches. In particular embodiments, user interface 900 substantially consumes the entire display screen of the client device or the entire portion of the screen of the client device in which user interface 900 is displayed.

In particular embodiments, in response to the search query received from the user, the search tool may conduct a search using appropriate searching algorithms to identify and compile a set of search results considered relevant to the search query, as illustrated in STEP 803. The search results may be obtained from various informational sources, such as information stored locally on the client device used by the user, information publicly available on the Internet, and/or information associated with a website or a system. For example, if the user is a member of a social-networking website, the search results may include information stored with or associated with the social-networking website. The search results may have various formats, such as texts, audios, videos, clickable links, executables, web feeds, etc. Search results obtained from different informational sources may be combined together to compile the set of search results. Optionally, the search results may be ranked based on various criteria, such as their relative degrees of relevance to the search query, their respective popularities, the user's personal preferences or interests, social-networking information relevant to the user, etc.

Figure 10:
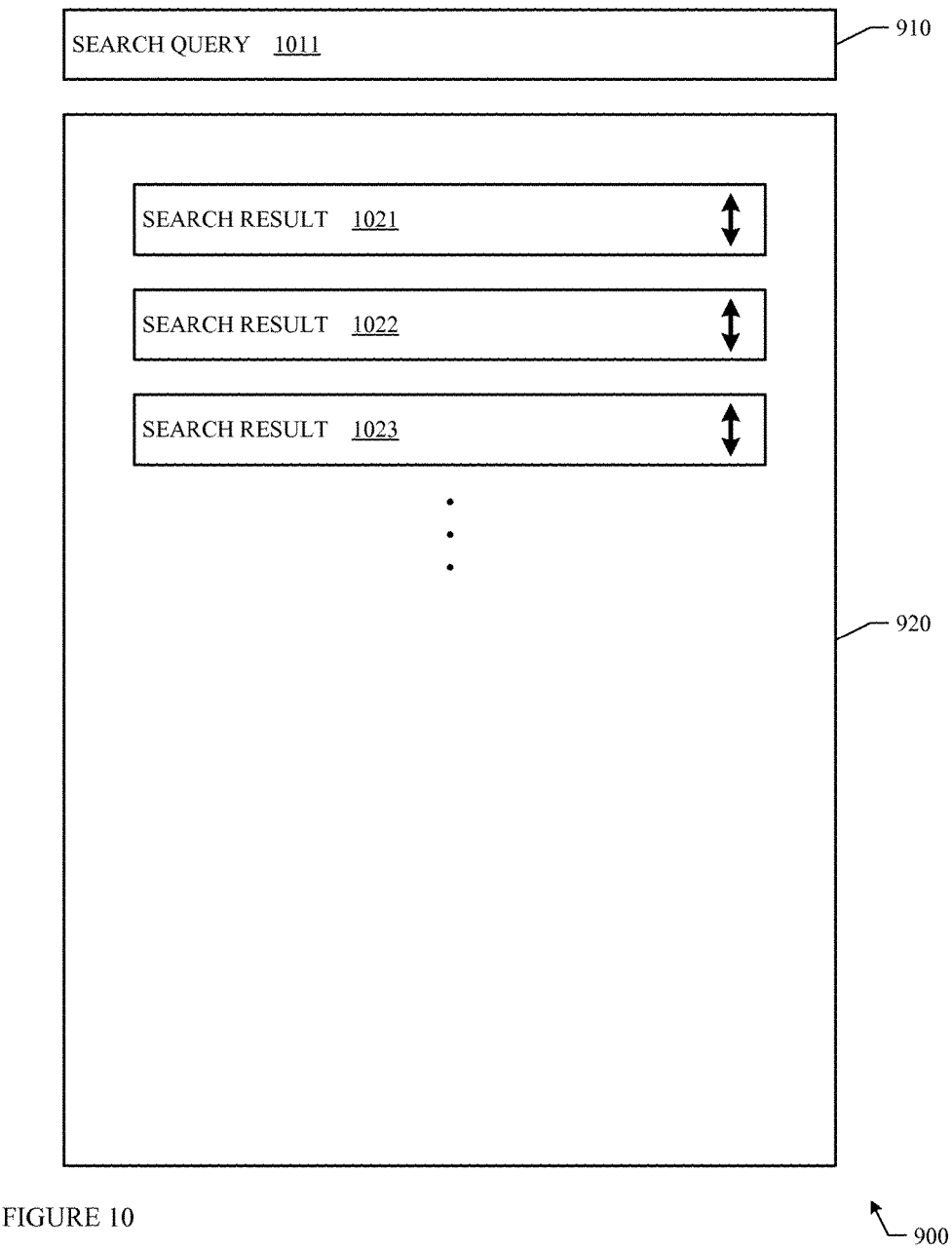
FIG. 10-11 illustrate example presentations of search results in the user interface of a search tool.

In particular embodiments, the set of search results may be presented to the user, as illustrated in STEP 805. FIG. 10 illustrates user interface 900 where a number of search results 1021, 1022, 1023, . . . , which has been identified in response to a search query 1011 received from the user, is displayed in output area 920. The user may interact with any one of the displayed search results (e.g., by clicking or tapping on it). For example, suppose that the user interacts with search result 1021. Depending on the nature, type, or current state of search result 1021 as well as the other search results in the set, the user interaction may result in several different responses.

Figure 11:
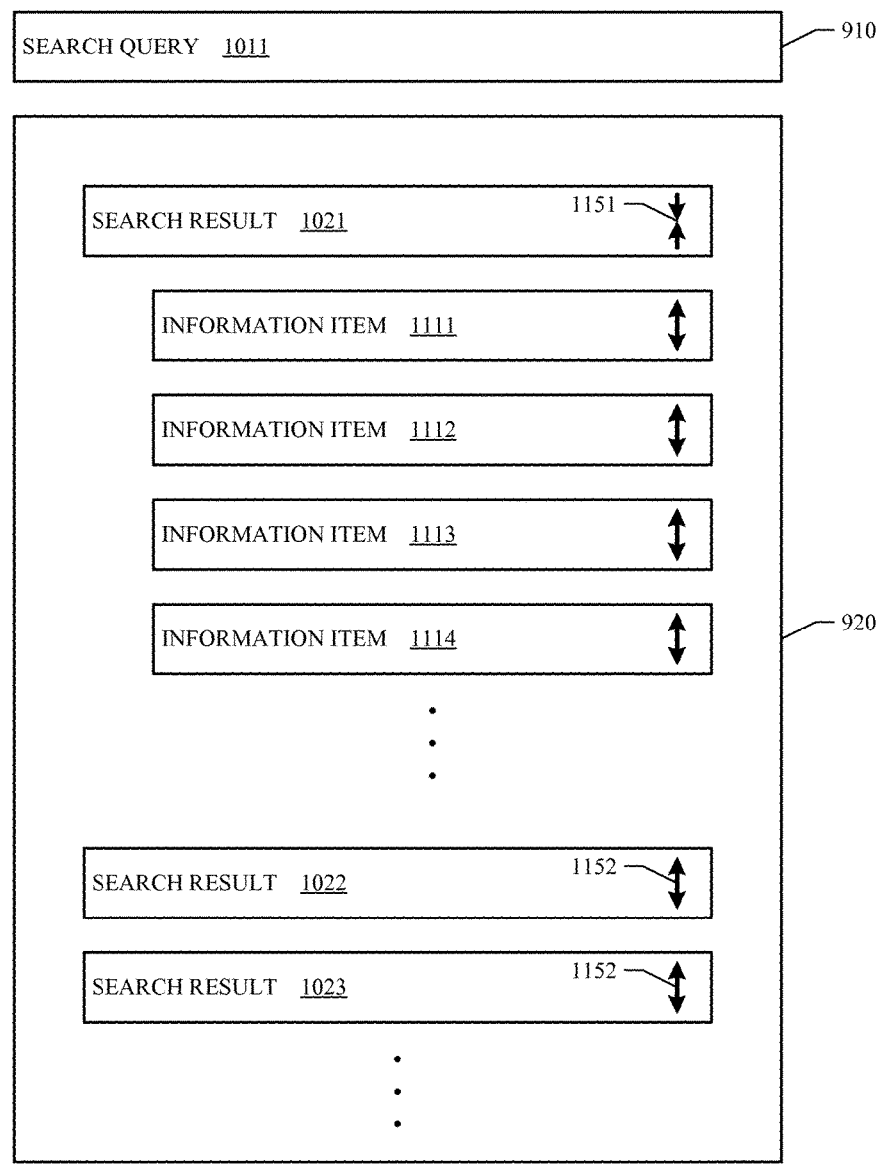

First, suppose that there are additional information associated with search result 1021. In this case, search result 1021 may be expanded so that the additional information associated with search result 1021 may be displayed, as illustrated in FIG. 11. In FIG. 11, a number of information items 1111, 1112, 1113, 1114, . . . , which is associated with search result 1021, is displayed below search result 1021. Consequently, search results 1022, 1023, . . . , are pushed further down to make room for information items 1111, 1112, 1113, 1114, . . . . Different search results may be associated with different information items. For example, suppose that the user has entered the word "pizza" for search query 1011, and search result 1021 is a pizza restaurant. In this case, information item 1111 may be the address of the pizza restaurant; information item 1112 may be customer reviews of the pizza restaurant; information item 1113 may be a map of the pizza restaurant; and information item 1114 may be a telephone number of the pizza restaurant. When search result 1021 is expanded as a result of the user interacting with it, the individual information items 1111, 1112, 1113, 1114, . . . associated with search result 1021 are displayed in close proximity to (e.g., below) search result 1021.

The user may choose to interact with any one of information items 1111, 1112, 1113, 1114, . . . in a similar manner as interacting with search results 1021, 1022, 1023, . . . . For example, the user may choose to interact with information item 1112, which includes the customer reviews of the pizza restaurant. By clicking or tapping on information item 1112, information item 1112 may be expanded so that the individual customer reviews of the pizza restaurant are displayed. The user may then read each review. The user may choose to interact with information item 1114, which is the telephone number of the pizza restaurant. Information item 1114 may be associated with a predefined call-to-action so that when the user clicks or taps on information item 1114, a telephone call to the pizza restaurant is initiated.

In some embodiments, only one search result in a set of search results may be expanded at a time. In this case, when the user interacts with search result 1021, if there is any other search result in the set that is currently in expanded form, that search result is automatically collapsed so that no information item associated with that search result is displayed. Only information items 1111, 1112, 1113, 1114, . . . associated with search result 1021 are displayed. Alternatively, in other embodiments, multiple search results in a set of search results may be expanded concurrently. In this case, when the user interacts with search result 1021, if there is any other search result in the set that is currently in expanded form, that search result remains expanded so that information items associated with that search result, if any, are displayed as well.

In particular embodiments, an icon is displayed in connection with each search result 1021, 1022, 1023, . . . as well as each information item associated with a search result (e.g., information items 1111, 1112, 1113, 1114, . . . ). The icon indicates whether the associated search result or information item is currently in expanded or collapsed form. For example, in FIG. 11, search result 1021 is currently in expanded form and is associated with an icon 1151. On the other hand, search results 1022 and 1023 are currently in collapsed form and are each associated with an icon 1152. In particular embodiments, when a user interacts with icon 1151, it causes the associated search result or information item to be collapsed. When the user interacts with icon 1152, it causes the associated search result or information item to be expanded.

It is possible that a search result is not associated with any additional information item. In this case, when the user interacts with such a search result, the search result is not expanded because there is no information item associated with the search result to display to the user.

Second, suppose that search result 1021 is already in expanded form when the user interacts with it. In this case, the user's interaction with search result 1021 once again causes search result 1021 to be collapsed so that no information item associated with search result 1021 is displayed, as illustrated in STEP 813. In particular embodiments, a search result or information item may be toggled between expanded form and collapsed form when a user interacts with it. For example, the first time the user interacts with the search result or information item, it causes the search result or information item to be expanded. The second time the user interacts with the search result or information item, it causes the search result or information item to be collapsed. And so on.

Third, suppose that search result 1021 is associated with a call-to-action. In this case, the user's interaction with search result 1021 may cause the underlying action of the call-to-action associated with search result 1021 to be performed, as illustrated in STEP 815. For example, if a call-to-action associated with search result 1021, which may be a pizza restaurant, is making a reservation at the restaurant, then when the user interacts with search result 1021, a reservation at the restaurant may be made on behalf of the user.

It is possible that a search result may be associated with multiple calls-to-action. Each call-to-action may be displayed in connection with the search result (e.g., as an icon), and each call-to-action has a predefined underlying action. The user may choose which call-to-action to invoke by interacting with (e.g., clicking or tapping on) the appropriate icon.

Fourth, suppose that search result 1021 is a link to another information item (e.g., a web page). In this case, the user's interaction with search result 1021 may cause the linked information item to be displayed, as illustrated in STEP 817. In some embodiments, the linked information item may be displayed in place (e.g., in situ) below search result 1021. In this case, search result 1021 is expanded. Search results 1022, 1023, . . . may be pushed further down to make room for the linked information item. This may be more suitable if the linked information item has a relatively small amount of information and can be displayed within a relatively small area. In other embodiments, the linked information item may occupy the entire screen of the client device, replacing search results 1021, 1022, 1023, . . . all together. This may be more suitable if the linked information item has a relatively large amount of information and require a relatively large area to display, such as in the case of a web page.

The user may interact with any one of search results 1021, 1022, 1023, . . . similarly. In some embodiments, user interface 900, which includes a set of search results as illustrated in FIGS. 10 and 11, may occupy substantially the entire screen of the client device. In other embodiments, user interface 900 may be displayed within a specific area within the screen of the client device. When there are more search results or information items that can be fitted within the screen or the designated area within the screen of the client device, the user may scroll or page up or down so that additional search results or information items may be displayed.

In particular embodiments, an information item may be associated with any number of calls-to-action. Note that a search result may be considered a specific type of information item, and thus, a search result may be similarly associated with any number of calls-to-action. Each call-to-action may have an underlying action. When a user interacts with a specific information item, and the interaction is with respect to a specific call-to-action associated with the specific information item, the underlying action may be performed.

Sometimes, a call-to-action, as well as its underlying action, associated with an information item may be defined by a system managing the information item. Other times, a call-to-action, as well as its underlying action, associated with an information item may be defined by another system (i.e., a system not managing the information item). For clarification purposes, let the system responsible for managing the information items be referred to as the "first-party system", and let other systems (i.e., those systems not managing the information items) be referred to as "third-party systems". In particular embodiments, the first-party system may provide a platform that enables third-party systems to associate calls-to-action with individual information items managed by the first-party system.

Figure 12:
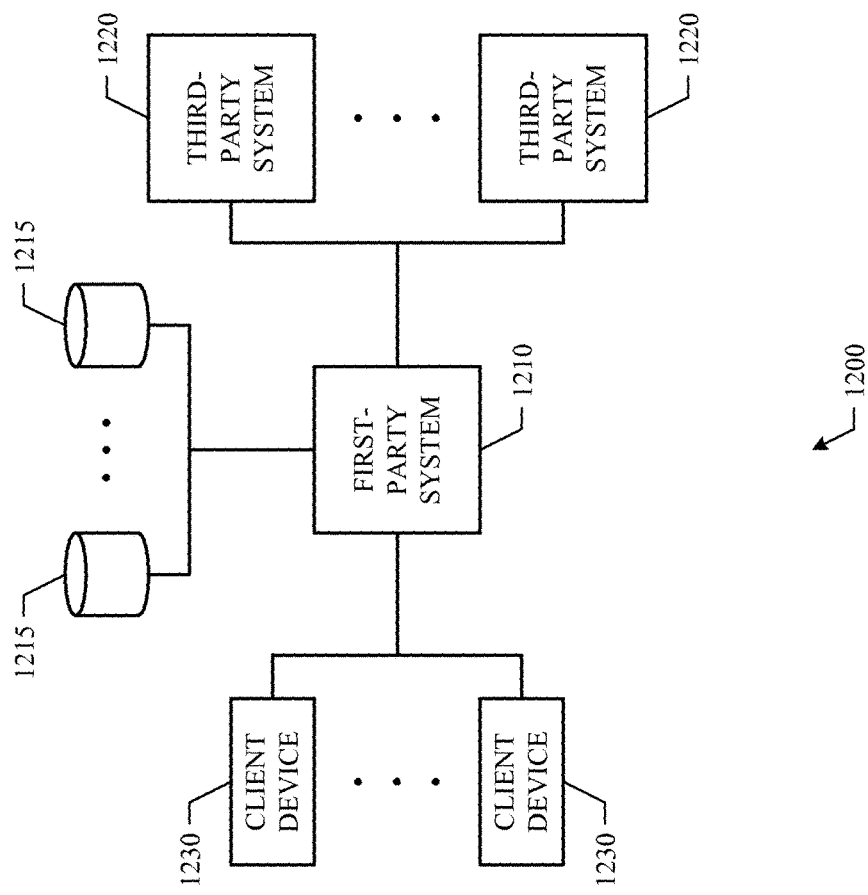
FIG. 12 illustrates an example system that enables third-party systems to associate calls-to-action to individual information items managed by a first-party system.

FIG. 12 illustrates an example system 1200 that enables third-party systems 1220 to associate calls-to-action to individual information items managed by a first-party system 1210. In particular embodiments, first-party system 1210 may be coupled to a number of datastores 1215, which may be used for storing various types of information, such as some of the information items managed first-party system 1210 and their hierarchical relationships. Client devices 1230 may be communicatively linked to first-party system 1210 so that first-party system 1210 may send data to client devices 1230 when appropriate. A number of third-party systems 1220 may also be communicatively linked to first-party system 1210.

FIG. 13 illustrates an example method for a third-party system to associate calls-to-action to individual information items managed by a first-party system. Suppose that a third-party system (e.g., third-party system 1220) wishes to associate a call-to-action defined by the third-party system with a number of information items managed a first-party system (e.g., first-party system 1210). Note that the same call-to-action may be associated with a single information item or multiple information items. In particular embodiments, the third-party system may register with the first-party system to associate the call-to-action with the specific information items, as illustrated in STEP 1301.

In some implementations, each third-party system has a unique identifier (ID), referred to as a "graphic ID". The first-party system may provide an Application Programming Interface (API) for use by the third-party systems. The API may include functions that may be invoked by the third-party systems. When a third-party system wishes to register with the first-party system to associate one of its calls-to-action with a number of specific information items, the third-party system may invoke the appropriate function provided in the API. Through the function, the third-party system may provide the first-party system: (1) graphic ID of the third-party system; (2) the call-to-action to be registered with the first-party system and the specific information items with which the call-to-action should be associated; and (3) the underlying action and the outcome of the action. Note that multiple third-party systems may associate multiple calls-to-action with the same information item.

When specifying the specific information items with which a call-to-action is associated, the third-party system may provide a list of specific information items to the first-party system. In this case, the call-to-action is associated with each information item on the list. Alternatively, the third-party system may specify a category of information items to the first-party system so that the call-to-action is associated with all the information items belonging to that category. For example, a third-party system may provide a service to make reservations at restaurants for users. This third-party system may define a call-to-action named "make reservation" and register this call-to-action with the first-party system. The third-party system may provide a list of specific restaurants with which the "make reservation" call-to-action should be associated. Alternatively, the third-party system may specify a category of restaurants (e.g., all Italian restaurants or all restaurants located in San Francisco) so that the "make reservation" call-to-action is associated with each restaurant belonging to that category of restaurants.

In particular embodiments, upon receiving a registration API call from a third-party system, the first-party system may store the registration information (e.g., in datastores 1215), which includes the graphic ID of the third-party system, the call-to-action, the information items with which the call-to-action should be associated, the underlying action, and the outcome of the action, as illustrated in STEP 1302.

In some implementations, the API may provide functions so that a third-party system is able to register a single call-to-action or multiple calls-to-action with the first-party system at a time. In the latter case, for example, the third-party system may submit a list of calls-to-action (e.g., as a text file) to the first-party system, and the information items to be associated with each call-to-action on the list. The first-party system may process the entire list to register all the calls-to-action on the list.

An information item may or may not be associated with any call-to-action. If an information item is associated with calls-to-action, it may be associated with any number of calls-to-action. These calls-to-action may be defined by the first-party system managing the information item, or any number of third-party systems, or both. In some implementations, a call-to-action may be associated with a Uniform Resource Locator (URL). For example, for a third-party provided call-to-action, the URL may reference a network resource (e.g., a web page in the third-party system, or a server-side script provided by the third-party system) associated with the third-party system that defines the call-to-action. The third-party system may define and map the URL for its call-to-action. Thus, each information item may be associated with a list of calls-to-action, and for each call-to-action on the list, its relevant information, such as the graphic ID of the third-party system providing the call-to-action, the action to be performed, the result of the action, and URL mapping to the corresponding third-party system, may also be maintained in the list.

FIG. 14 illustrates an example method for presenting third-party supplied calls-to-action in connection with their associated information items on a client device. Suppose that a set of information items is displayed on a client device, as illustrated in STEP 1401, and a user interacts with (e.g., clicking or tapping on) a specific information item from the hierarchy, as illustrated in STEP 1402. This specific information item may or may not be associated with any call-to-action, and if this specific information item is associated with calls-to-action, they may be defined by the first-party system or any number of third-party systems.

In some implementations, when a user interacts with a specific information item, the client device sends a request to the first-party system, asking for calls-to-action, if any, associated with that specific information item. To do so, in some implementations, the client device may invoke a serve-side script (e.g., implemented using JavaScript or PHP) provided by the first-party system. The first-party system determines whether there is any call-to-action, including call-to-action supplied by third-party systems, associated with the information item, as illustrated in STEP 1403. If so, the first-party system collects the calls-to-action associated with the specific information item and sends them to the client device, as illustrated in STEP 1404. The calls-to-action, including third-party supplied calls-to-action, if any, associated with the specific information item are displayed on the client device (e.g., by expanding the specific information item), as illustrated in STEP 1405. The user may then choose to interact with any one of the calls-to-action to perform the corresponding underlying action. In this case, the client device requests the calls-to-action associated with an information item from the first-party system only when the user interacts with that information item (i.e., on demand).

Alternatively, in other implementations, as soon as the set of information items is displayed on the client device, the client device may request calls-to-action associated with each displayed information item from the first-party system (e.g., while the user is reviewing the displayed information items), again by invoking appropriate server-side scripts. The first-party system sends the calls-to-action associated with the displayed information items, if any, to the client device so that they are readily available when the user chooses to interact with any specific information item. In this case, the client device requests the calls-to-action associated with the displayed information items from the first-party system before they are actually needed (i.e., pre-fetching).

In particular embodiments, regardless of when the client device receives the calls-to-action associated with an information item, the client device may cache the calls-to-action associated with some information items locally. For example, if the user often interacts with a specific information item, its associated calls-to-action may be cached locally so that the client device does not need to request the calls-to-action from the first-party system every time the user interacts with that information item.

Suppose that the user chooses to interact with a specific call-to-action provided by a third-party system. This causes the underlying action to be performed. In particular embodiments, a call-to-action and the result of the action may be contained in a HTML <iframe> tag. In some implementations, the first-party system is responsible for defining and managing the <iframe> tag. When the user invokes a call-to-action, a request is made to the first-party system and sent from the client device. The first-party system optionally processes the request and redirects the request to the third-party system associated with the call-to-action. This may be achieved by invoking the URL referencing the appropriate network resource of the third-party system. The third-party system performs the action, and sends the result of the action to the first-party system. The first-party system in turn sends the result of the action to the client device to be displayed in the <iframe> tag. Alternatively, in other implementations, each third-party is allowed to define and manage the <iframe> tag containing its own call-to-action. When the user invokes a call-to-action, a request is made from the client device directly to the third-party system associated with the call-to-action. Again, this may be achieved by invoking the URL referencing the appropriate network resource of the third-party system, which may be included in the <iframe> tag. The third-party system performs the action, and sends the result of the action to the client device, which displays the result of the action in the <iframe> tag.

For example, suppose that a third-party system providing restaurant reservation services to users has defined a "make reservation" call-to-action and registered with the first-party system to associate this "make reservation" call-to-action with specific restaurants (i.e., information items). Further suppose that a restaurant associated with this "make reservation" call-to-action is displayed to a user and the user has chosen to invoke the call-to-action. The "make reservation" call-to-action may be associated with a URL referencing a network resource of the third-party system. When the user interacts with the "make reservation" call-to-action, the network resource of the third-party system referenced by the URL is accessed, either directly by the client device or through the first-party system. The third-party system makes a reservation at the restaurant on the user's behalf. In some implementations, by default, the reservation is made 30 minutes or an hour from the time the user invokes the call-to-action. The third-party system sends a confirmation (i.e., the result of the action) to the client device, either directly or through the first-party system. The client device displays the confirmation to the user.

In particular embodiments, a user may select which third-party provided calls-to-action he or she wishes to receive when being presented with information items associated with these third-party provided calls-to-action. In some implementations, when a user interacts with an information item that is associated with a third-party provided call-to-action, the user may be asked whether he or she wishes to receive this specific call-to-action or whether he or she wishes to receive any call-to-action provided by this third-party system. The user's choice may be recorded for future reference. For example, if the user indicates that he or she does not wish to receive this specific call-to-action, then this specific call-to-action shall not be presented to the user, even if it is also associated with other information items. Similarly, if the user indicates that he or she does not wish to receive any call-to-action provided by this third-party system, then no call-to-action provided by this third-party system, regardless of with which information item it is associated, shall be presented to the user.

In other implementations, a user may be asked to select which specific calls-to-action or calls-to-action provided by which specific third-party systems he or she wishes to receive on a per-session basis. Thus, if the user indicates that he or she does not wish to receive a specific call-to-action, then this specific call-to-action shall not be presented to the user during the current session. Similarly, if the user indicates that he or she does not wish to receive any call-to-action provided by a specific third-party system, then no call-to-action provided by this third-party system shall be presented to the user during the current session. However, when a new session is started, the user may be asked to make the selection again. In this case, if a user has chosen to reject a specific call-to-action or a specific third-party system during a previous session, the user can still receive that call-to-action or calls-to-action provided by that third-party system during a new session.

Figure 15:
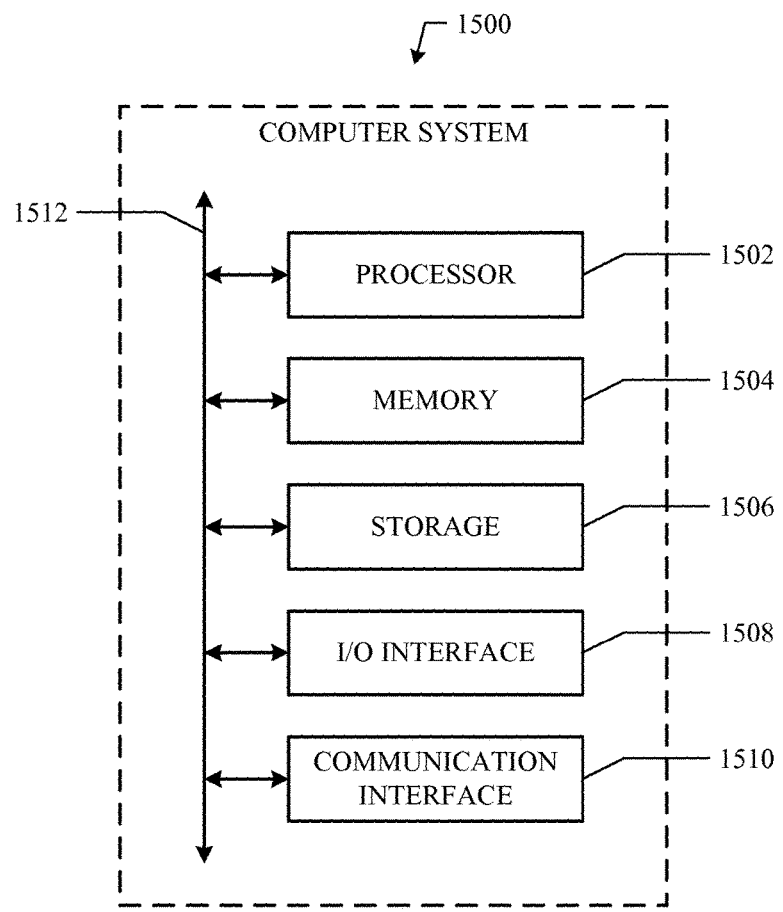
FIG. 15 illustrates an example computer system.

Particular embodiments may be implemented on one or more computer systems. FIG. 15 illustrates an example computer system 1500. The information items may be displayed on a display screen coupled to computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1500 may include one or more computer systems 1500; be unitary or distributed; span multiple locations; span multiple machines; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include an HDD, a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1502 (such as, for example, one or more internal registers or caches), one or more portions of memory 1504, one or more portions of storage 1506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising:
by a first computing system of a social network:
providing to a third-party computing system an Application Programming Interface (API);

receiving via the API, from the third-party computing system, a registration API function call including a registration request to associate an information item managed by the first computing system with a call-to-action defined by the third-party computing system, the information item to be provided for display on a screen of a mobile client device of a user of the social network, wherein the registration request specifies registration information that includes:
the information item,
the call-to-action,
an underlying action to be performed in response to user interaction with the call-to-action in connection with display of the information item on the mobile client device,
a unique identifier of the third-party computing system, and
a Uniform Resource Locator (URL) associated with the call-to-action, wherein the URL references a network resource for the underlying action;
in response to receiving the registration API function call from the third-party computing system, registering the call-to-action based on the registration information;
after registering the call-to-action:
providing, to the mobile client device for display on the screen, a set of information items organized in a hierarchy, wherein:
the information item is part of the set of information items, and
the hierarchy as provided is collapsed; and
receiving a first request from the mobile client device associated with the user of the social network, wherein the first request indicates that the user expanded the hierarchy to display the set of information items on the screen and interacted with the information item displayed in the expanded hierarchy;
in response to the first request, determining whether the information item with which the user interacted is associated with the call-to-action provided by the third-party computing system; and
in response to determining that the information item is associated with the call-to-action, sending the call-to-action to the mobile client device to be displayed on the screen of the mobile client device in connection with the information item by expanding the information item.

2. The method of claim 1, wherein:
multiple sets of information items are concurrently displayed on the screen of the mobile client device;
the set of information items is one of the multiple sets of information items displayed on the mobile client device;
each of the multiple sets of information items is organized in a hierarchy; and
each hierarchy concurrently displayed on the screen of the mobile client device is initially collapsed.

3. The method of claim 1, further comprising:
by the first computing system, receiving a second request from the mobile client device, wherein the second request indicates that the user interacted with the call-to-action displayed on the mobile client device in connection with the information item; and in response to the second request:
by the first computing system, determining that the third-party computing system provides the call-to-action;
by the first computing system, sending a third request to the third-party computing system providing the call-to-action, the third request indicating the call-to-action;
by the first computing system, receiving a response to the third request from the third-party computing system providing the call-to-action, the response indicating a result of performing the underlying action for the call-to-action; and
by the first computing system, sending the result of performing the underlying action to the mobile client device to be displayed on the screen of the mobile client device.

4. The method of claim 1, wherein the user interacting with the information item displayed on the mobile client device comprises the user clicking or tapping on the information item displayed on the screen of the mobile client device.

5. The method of claim 1, further comprising:
by the first computing system, in response to the first request, if the information item is associated with the call-to-action provided by the third-party computing system, then refraining from sending any call-to-action previously rejected by the user of the mobile client device to the mobile client device.

6. The method of claim 1, further comprising:
by the first computing system, in response to the first request, if the information item is associated with the call-to-action provided by the third-party computing system, then refraining from sending calls-to-action provided by any third-party computing system previously rejected by the user of the mobile client device to the mobile client device.

7. The method of claim 1, further comprising:
by the first computing system, receiving via the API a registration request from a different third-party computing system, the registration request from the different third-party computing system comprising an identifier of the different third-party computing system, one or more calls-to-action provided by the different third-party computing system, and a list of one or more information items to be associated with each of the one or more calls-to-action provided by the different third-party computing system; and
by the first computing system, in response to the registration request from the different third-party computing system, associating the one or more calls-to-action provided by the different third-party computing system with the corresponding one or more information items indicated by the registration request from the different third-party computing system.

8. The method of claim 7, wherein the registration request from the different third-party computing system further comprises, for each of the one or more calls-to-action provided by the different third-party computing system, a corresponding underlying action to be performed and a Uniform Resource Locator referencing a network resource associated with the different third-party computing system.

9. The method of claim 1, further comprising, in response to the first request:
by the first computing system, determining whether the information item is associated with any call-to-action provided by the first computing system; and by the first computing system, if the information item is associated with one or more calls-to-action provided by the first computing system, then sending the one or more calls-to-action provided by the first computing system to the mobile client device to be displayed on the mobile client device in connection with the information item by expanding the information item.

10. The method of claim 1, wherein the information item is a first information item, the call-to-action is a first call-to-action, and the method further comprises:
by the first computing system, for each of a plurality of information items managed by the first computing system, including the first information item, maintaining a list of calls-to-action associated with each information item, wherein each call-to-action on the list of calls-to-action is provided by the first computing system or a third-party computing system,
wherein:
the first call-to-action is part of a list of calls-to-action associated with the first information item; and
the list of calls-to-action associated with the first information item is displayed on the screen of the mobile client device in connection with the first information item by expanding the first information item.

11. A first system comprising:
a memory comprising instructions executable by one or more processors; and
the one or more processors coupled to the memory and operable to execute the instructions, the one or more processors being operable when executing the instructions to:
provide to a third-party computing system an Application Programming Interface (API);
receive via the API, from the third-party computing system, a registration API function call including a registration request to associate an information item managed by the first system with a call-to-action defined by the third-party computing system, the information item to be provided for display on a screen of a mobile client device of a user of a social network provided by the first system, wherein the registration request specifies registration information that includes:
the information item,
the call-to-action,
an underlying action to be performed in response to user interaction with the call-to-action in connection with display of the information item on the mobile client device,
a unique identifier of the third-party computing system, and
a Uniform Resource Locator (URL) associated with the call-to-action, wherein the URL references a network resource for the underlying action;
in response to receiving the registration API function call from the third-party computing system, register the call-to-action based on the registration information;
after registering the call-to-action:
provide, to the mobile client device for display on the screen, a set of information items organized in a hierarchy, wherein:
the information item is part of the set of information items, and
the hierarchy as provided is collapsed; and
receive a first request from the mobile client device associated with the user of the social network, the first request indicating that the user expanded the hierarchy to display the set of information items on the screen and interacted with the information item displayed in the expanded hierarchy;
in response to the first request, determine whether the information item with which the user interacted is associated with the call-to-action provided by the third-party computing system; and
in response to determining that the information item is associated with the call-to-action, send the call-to-action to the mobile client device to be displayed on the mobile client device in connection with the information item by expanding the information item.

12. The first system of claim 11, wherein:
multiple sets of information items are concurrently displayed on the screen of the mobile client device;
the set of information items is one of the multiple sets of information items displayed on the mobile client device;
each of the multiple sets of information items is organized in a hierarchy; and
each hierarchy concurrently displayed on the screen of the mobile client device is initially collapsed.

13. The first system of claim 11, wherein the one or more processors are further operable when executing the instructions to:
receive a second request from the mobile client device, the second request indicating that the user interacted with the call-to-action displayed on the mobile client device in connection with the information item; and
in response to the second request:
determine that the third-party computing system provides the call-to-action;
send a third request to the third-party computing system providing the call-to-action, the third request indicating the call-to-action;
receive a response to the third request from the third-party computing system providing the call-to-action, the response indicating a result of performing the underlying action for the call-to-action; and
send the result of performing the underlying action to the mobile client device to be displayed on the screen of the mobile client device.

14. The first system of claim 11, wherein the user interacting with the information item displayed on the mobile client device comprises the user clicking or tapping on the information item displayed on the screen of the mobile client device.

15. The first system of claim 11, wherein the one or more processors are further operable when executing the instructions to:
in response to the first request, if the information item is associated with the call-to-action provided by the third-party computing system, then refrain from sending any call-to-action previously rejected by the user of the mobile client device to the mobile client device.

16. The first system of claim 11, wherein the one or more processors are further operable when executing the instructions to:
in response to the first request, if the information item is associated with the call-to-action provided by the third-party computing system, then refrain from sending calls-to-action provided by any third-party computing system previously rejected by the user of the mobile client device to the mobile client device.

17. The first system of claim 11, wherein the one or more processors are further operable when executing the instructions to:
- receive via the API a registration request from a different third-party computing system, the registration request from the different third-party computing system comprising an identifier of the different third-party computing system, one or more calls-to-action provided by the different third-party computing system, and a list of one or more information items to be associated with each of the one or more calls-to-action provided by the different third-party computing system; and
- in response to the registration request from the different third-party computing system, associate the one or more calls-to-action provided by the different third-party computing system with the corresponding one or more information items indicated by the registration request from the different third-party computing system.

18. The first system of claim 11, wherein the one or more processors are further operable when executing the instructions to:
- in response to the first request:
  - determine whether the information item is associated with any call-to-action provided by the first system; and
  - if the information item is associated with one or more calls-to-action provided by the first system, then send the one or more calls-to-action provided by the first system to the mobile client device to be displayed on the mobile client device in connection with the information item by expanding the information item.

19. The first system of claim 11, wherein the information item is a first information item, the call-to-action is a first call-to-action, and the one or more processors are further operable when executing the instructions to:
- for each of a plurality of information items managed by the first system, including the first information item, maintain a list of calls-to-action associated with the information item, wherein each call-to-action on the list of calls-to-action is provided by the first system or a third-party computing system, wherein:
- the first call-to-action is part of a list of calls-to-action associated with the first information item; and
- the list of calls-to-action associated with the first information item is displayed on the screen of the mobile client device in connection with the first information item by expanding the first information item.

20. One or more computer-readable non-transitory storage media embodying software operable when executed by a first computing system to:
- provide to a third-party computing system an Application Programming Interface (API);
- receive via the API, from the third-party computing system, a registration API function call including a registration request to associate an information item managed by the first computing system with a call-to-action defined by the third-party computing system, the information item to be provided for display on a screen of a mobile client device of a user of a social network provided by the first computing system, wherein the registration request specifies registration information that includes:
  - the information item,
  - the call-to-action,
  - an underlying action to be performed in response to user interaction with the call-to-action in connection with display of the information item on the mobile client device,
  - a unique identifier of the third-party computing system, and
  - a Uniform Resource Locator (URL) associated with the call-to-action, wherein the URL references a network resource for the underlying action;
- in response to receiving the registration API function call from the third-party computing system, register the call-to-action based on the registration information;
- after registering the call-to-action:
  - provide, to the mobile client device for display on the screen, a set of information items organized in a hierarchy, wherein:
    - the information item is part of the set of information items, and
    - the hierarchy as provided is collapsed; and
  - receive a first request from the mobile client device associated with the user of the social network, the first request indicating that the user expanded the hierarchy to display the set of information items on the screen and interacted with the information item displayed in the expanded hierarchy;
- in response to the first request, determine whether the information item with which the user interacted is associated with the call-to-action provided by the third-party computing system; and
- in response to determining that the information item is associated with the call-to-action, send the call-to-action to the mobile client device to be displayed on the screen of the mobile client device in connection with the information item by expanding the information item.

21. The method of claim 1, further comprising, by the first computing system:
- providing, to the mobile client device for display on the screen, a graphical user interface for the social network;
- receiving a search query from the mobile client device through the graphical user interface, wherein the set of information items corresponds to the search query; and
- fetching the set of information items.

* * * * *